(12) United States Patent
Imai et al.

(10) Patent No.: US 9,995,986 B2
(45) Date of Patent: Jun. 12, 2018

(54) LIGHT CONTROL ELEMENT, LIGHT CONTROL DEVICE, AND METHOD FOR PRODUCING LIGHT CONTROL ELEMENT

(71) Applicant: NLT TECHNOLOGIES, LTD., Kawasaki, Kanagawa (JP)

(72) Inventors: Ayuko Imai, Kawasaki (JP); Ken Sumiyoshi, Kawasaki (JP)

(73) Assignee: NLT Technologies, Ltd., Kawasaki (JP)

( * ) Notice: Subject to any disclaimer, the term of this patent is extended or adjusted under 35 U.S.C. 154(b) by 0 days. days.

(21) Appl. No.: 15/406,048

(22) Filed: Jan. 13, 2017

(65) Prior Publication Data
US 2017/0205681 A1    Jul. 20, 2017

(30) Foreign Application Priority Data

Jan. 14, 2016    (JP) .................. 2016-005567
Aug. 30, 2016    (JP) .................. 2016-168300

(51) Int. Cl.
| | | |
|---|---|---|
| *G02F 1/153* | (2006.01) | |
| *B32B 37/14* | (2006.01) | |
| *G02F 1/15* | (2006.01) | |
| *G02F 1/163* | (2006.01) | |

(52) U.S. Cl.
CPC ............ *G02F 1/1533* (2013.01); *B32B 37/14* (2013.01); *G02F 1/1506* (2013.01); *G02F 1/1525* (2013.01); *G02F 1/163* (2013.01); *B32B 2307/202* (2013.01); *B32B 2307/412* (2013.01); *G02F 2001/1519* (2013.01); *G02F 2001/1536* (2013.01); *G02F 2202/38* (2013.01)

(58) Field of Classification Search
CPC .............. B32B 37/14; B32B 2037/202; B32B 2307/412; G02F 1/1533; G02F 1/1525; G02F 1/1506; G02F 1/163; G02F 2001/1536; G02F 2001/1519; G02F 2202/38
USPC ........ 359/237, 238, 240, 245, 265, 267, 270
See application file for complete search history.

(56) References Cited

U.S. PATENT DOCUMENTS

| 7,545,551 | B2 * | 6/2009 | Yoshimura ............ G02F 1/1525 359/265 |
| 8,773,746 | B2 * | 7/2014 | Tajima .................... C03C 17/36 359/267 |
| 2010/0188726 | A1 | 7/2010 | Yoshimura et al. |

FOREIGN PATENT DOCUMENTS

JP    5136978 B2    2/2013

* cited by examiner

*Primary Examiner* — Tuyen Tra
(74) *Attorney, Agent, or Firm* — Sughrue Mion, PLLC

(57) ABSTRACT

There is provided a light control element including a transparent conductive film, a proton accumulation layer on the transparent conductive film, an inorganic electrolyte layer on the proton accumulation layer, an organic electrolyte layer on the inorganic electrolyte layer, a catalyst layer on the organic electrolyte layer, and a light control mirror layer on the catalyst layer.

15 Claims, 19 Drawing Sheets

LIGHT CONTROL ELEMENT, LIGHT CONTROL DEVICE, AND METHOD FOR PRODUCING LIGHT CONTROL ELEMENT

CROSS-REFERENCE TO RELATED APPLICATIONS

This non-provisional application claims priority under 35 U.S.C. § 119(a) on Patent Application No. 2016-005567 filed in Japan on Jan. 14, 2016, and Patent Application No. 2016-168300 filed in Japan on Aug. 30, 2016, the entire contents of which are hereby incorporated by reference.

FIELD

The present disclosure relates to a light control element, a light control device, and a method for producing a light control element.

BACKGROUND

A light control element which varies reflectance of light by means of application of a voltage is proposed (see Japanese Patent No. 5136978). The light control element reversibly changes optical characteristics. The light control element, for example, reversibly changes into a transmission state of allowing light to be transmitted or a mirror state of allowing light to be reflected. As an adoption example of the light control element, there is an example in which the light control element is applied to a window material for buildings or vehicles. In such a window material, optical characteristics are changed depending on ambient environment, and thus cooling and heating load is reduced.

In the light control element, as one of systems of changing reflectance, there is an electrochromic system. As a light control element of the electrochromic system, there is proposed a light control element in which a transparent conductive film layer, a proton accumulation layer, an electrolyte layer, a catalyst layer, and a light control mirror layer are laminated on a glass substrate. In this reflection light control element, protons (hydrogen ions $H^+$) move between the proton accumulation layer and the light control mirror layer, and thus the reflectance is changed. In the reflection light control element, when a voltage is applied in a predetermined direction, protons move from the proton accumulation layer to the light control mirror layer through the electrolyte layer and the catalyst layer, and thus the reflectance of the light control mirror layer is changed. When a voltage is applied in the opposite direction, protons return from the light control mirror layer to the proton accumulation layer, and thus the reflectance of the light control mirror layer returns to original reflectance.

In the light control element of the electrochromic system, the electrolyte layer which characteristics are that ion conductance is high, that is, protons can move and electron conductance is low, may be used. As materials used for such an electrolyte layer, there is tantalum oxide ($Ta_2O_5$) or zirconium oxide ($ZrO_2$). In addition, as materials used as the catalyst layer, there is palladium (Pd) or platinum (Pt).

In production of a light control element, it is known that a light control element which does not normally operate is produced. That is, in production of a light control element, a yield ratio may be decreased in some cases.

SUMMARY

According to an aspect of the present disclosure, a light control element includes a transparent conductive film; a proton accumulation layer on the transparent conductive film; an inorganic electrolyte layer on the proton accumulation layer; an organic electrolyte layer on the inorganic electrolyte layer; a catalyst layer on the organic electrolyte layer; and a light control mirror layer on the catalyst layer.

It is to be understood that both the foregoing general description and the following detailed description are exemplary and explanatory and are not restrictive of this disclosure.

The above and further objects and features will more fully be apparent from the following detailed description with accompanying drawing.

DETAILED DESCRIPTION OF NON-LIMITING EXAMPLE EMBODIMENTS

Figure 1:
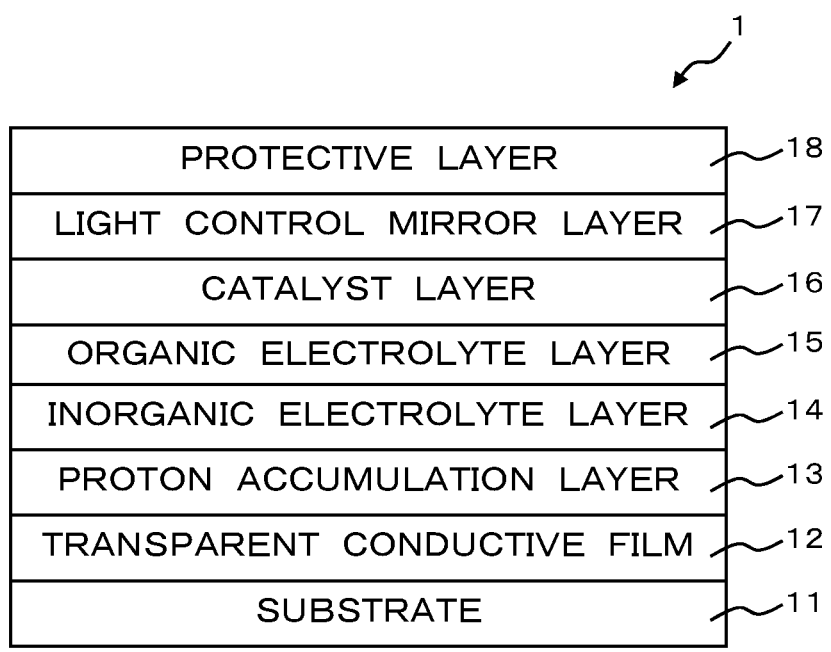
FIG. 1 is a cross-sectional view illustrating the configuration of an example of non-limiting light control element.

Hereinafter, a light control element disclosed in the present specification will be described in detail with reference to the drawings. FIG. 1 is a cross-sectional view illustrating the configuration of a light control element 1. The light control element 1 includes a transparent conductive film 12, a proton accumulation layer 13, an inorganic electrolyte layer 14, an organic electrolyte layer 15, a catalyst layer 16, a light control mirror layer 17, and a protective layer 18, a transparent conductive film 12 and these layers (13-18) are sequentially laminated on a substrate 11. In other words, the light control element 1 includes the transparent conductive film 12, the proton accumulation layer 13 on the transparent conductive film 12, the inorganic electrolyte layer 14 on the proton accumulation layer 13, the organic electrolyte layer 15 on the inorganic electrolyte layer 14, the catalyst layer 16 on the organic electrolyte layer 15, the light control mirror layer 17 on the catalyst layer 16, and the protective layer 18 on the light control mirror layer 17. In the above description, "on" used in, for example, the expression "on the catalyst layer 16" has a meaning of the direction of the layer to be laminated and does not always mean that the layer is arranged adjacent to a layer. For example, the expression "the light control mirror layer 17 is formed on the catalyst layer 16" indicates a case where the catalyst layer 16 and the light control mirror layer 17 are arranged adjacent to each other and a case where the catalyst layer 16 and the light control mirror layer 17 are arranged so that another layer is disposed between them. In addition, "on" indicates the upper direction in the drawings.

Incidentally, FIG. 1 is an explanatory diagram for describing the laminating order of each layer, and the thickness and size of each layer, and thick and thin regions in each layer (magnitude relationship) are not limited to embodiments illustrated in the drawing.

The substrate 11 is a transparent and plate-shaped member which allows light to be transmitted. The substrate 11 is formed, for example, by sheet glass, a resin sheet, or a combination of sheet glass and a resin sheet.

The transparent conductive film 12 is formed by a conductive material which allows light to be transmitted, for example, indium oxide ($In_2O_3$), tin oxide ($SnO_2$), an alloy of indium oxide and tin ($In_2O_3$—$SnO_2$, abbreviated as ITO), zinc oxide (ZnO), F-doped tin oxide (FTO, fluorine-doped tin oxide), or the like.

The proton accumulation layer 13 is formed by a material which enables accumulation or discharge of protons (hydrogen ions $H^+$) to be reversibly performed. The proton accumulation layer 13 is formed, for example, by a transition metal oxide such as tungsten oxide ($WO_3$), molybdenum oxide ($MoO_2$), niobium oxide ($Nb_2O_5$), or vanadium oxide ($V_2O_5$). When the proton accumulation layer 13 is formed by tungsten oxide, in a state where protons are accumulated, the proton accumulation layer 13 is changed to tungsten oxide hydride ($H_xWO_3$). When the proton accumulation layer 13 is changed from tungsten oxide to tungsten oxide hydride, the proton accumulation layer 13 is changed from the transparent state to the colored state. In addition, in a state where protons are discharged, the proton accumulation layer 13 is changed to tungsten oxide. When the proton accumulation layer 13 is changed from tungsten oxide hydride to tungsten oxide, the proton accumulation layer 13 is changed from the colored state to the transparent state. Protons discharged from the proton accumulation layer 13 move to the light control mirror layer 17. Furthermore, protons discharged from the light control mirror layer 17 are accumulated in the proton accumulation layer 13. In this way, the proton accumulation layer 13 is reversibly changed between the colored state and the transparent state depending on accumulation or discharge of protons.

The inorganic electrolyte layer 14 is formed by an inorganic material which enables protons to pass through, particularly, is desirably formed by a transparent metal oxide. For example, the inorganic electrolyte layer 14 is formed by tantalum oxide. The organic electrolyte layer 15 is formed by a material which enables protons to pass through, similarly to the inorganic electrolyte layer 14. Moreover, the organic electrolyte layer 15 is formed by a material which prevents a material (for example, palladium) forming the catalyst layer 16 from being diffused into the inorganic electrolyte layer 14. Incidentally, the details of the organic electrolyte layer 15 will be described later.

The catalyst layer 16 is formed by a material that increases a velocity of protons supplied to the light control mirror layer 17 or discharged from the light control mirror layer 17. The catalyst layer 16 is formed by an elemental metal such as palladium, platinum, or silver or an alloy thereof. Further, the catalyst layer 16 may be formed by silicon dioxide in which palladium particles are dispersed.

The light control mirror layer 17 is formed by a material which changes transmittance of light by occluding protons supplied through the catalyst layer 16 or discharging occluded protons. The light control mirror layer 17 is formed, for example, by an alloy of magnesium and calcium (Mg—Ca) or an alloy of magnesium and nickel, titanium, or niobium. When protons are occluded, the light control mirror layer 17 is in the transmission state of allowing light to be transmitted. When protons are discharged, the light control mirror layer 17 is in a reflection state of allowing light to be reflected. As described above, protons discharged from the proton accumulation layer 13 move to the light control mirror layer 17. The moved protons are occluded in the light control mirror layer 17. Further, protons discharged from the light control mirror layer 17 move to the proton accumulation layer 13. The moved protons are accumulated in the proton accumulation layer 13. In this way, the light control mirror layer 17 is reversibly changed between the transmission state and the reflection state depending on occlusion or discharge of protons.

The protective layer 18 is formed by a material which prevents the light control mirror layer 17 from being oxidized. Further, the protective layer 18 is formed by a material having a low reflectance of light. If the protective layer 18 is formed by a material having a high reflectance of light, light is reflected by the protective layer 18 even when the light control mirror layer 17 is in the transmission state. The light reflected by the protective layer 18 decreases transmittance of the entire light control element 1. The protective layer 18 is formed, for example, by an aluminum (Al) thin film. The protective layer 18 formed by the aluminum thin film can prevent the light control mirror layer 17 from being oxidized. Further, the aluminum thin film is oxidized in air to change to transparent alumina. When the aluminum thin film is changed to transparent alumina, the protective layer 18 does not decrease the transmittance of the entire light control element 1.

Figure 2:
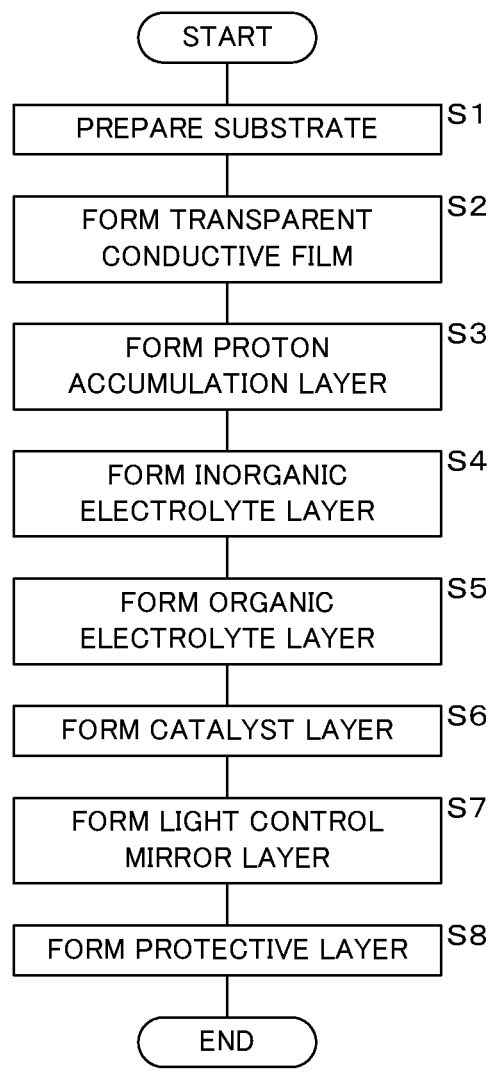
FIG. 2 is a flowchart illustrating the outline of production processes of the light control element.

FIG. 2 is a flowchart illustrating the outline of production processes of the light control element 1. An apparatus for producing the light control element 1 (hereinafter, referred to as the production apparatus) first prepares the substrate 11 of the light control element 1 (step S1). The production apparatus forms the transparent conductive film 12 on the substrate 11 (step S2). Subsequently, the production apparatus forms the proton accumulation layer 13 on the transparent conductive film 12 (step S3). Further, the production apparatus forms the inorganic electrolyte layer 14 on the proton accumulation layer 13 (step S4). Next, the production apparatus forms the organic electrolyte layer 15 on the inorganic electrolyte layer 14 (step S5). Then, the production apparatus forms the catalyst layer 16 on the organic electrolyte layer 15 (step S6). Then, the production apparatus forms the light control mirror layer 17 on the catalyst layer 16 (step S7). Finally, the production apparatus forms the protective layer 18 on the light control mirror layer 17 (step S8).

In formation of each layer, for example, a vacuum evaporation method, a sputtering method, an ion-plating method, and the like are used. In addition, as long as each material for forming each layer can be applied and formed, for example, various printing methods such as a spin coating method, a casting method, a microgravure coating method, a gravure coating method, a bar coating method, a roll coating method, a wire bar coating method, a dip coating method, a slit coating method, a capillary coating method, a spray coating method, a nozzle coating method, a gravure printing method, a screen printing method, a flexographic printing method, an off-set printing method, a reverse printing method, and an inkjet printing method may be used. The forming method to be used may be selected depending on materials for forming layers, thicknesses of layers, and the like.

In the production of the light control element 1, each layer may not be sequentially laminated but one layer or a plurality of layers may be separately formed and then attached to one another. The light control element 1 can be produced by using various known production methods as long as functions of respective layers constituting the light control element 1 are not impaired.

Next, the organic electrolyte layer 15 of the light control element 1 will be described. In the following description, as an example, a case where the catalyst layer 16 is formed by palladium and the inorganic electrolyte layer 14 is formed by tantalum oxide will be described. In the light control element 1 disclosed in the present specification, the organic electrolyte layer 15 is provided between the inorganic electrolyte layer 14 and the catalyst layer 16. The organic electrolyte layer 15 is formed by an organic material such as tantalum oxide ($Ta_2O_5$) formed by a sol-gel method, polyether ether ketone (PEEK), or Nafion®. As described above, the organic electrolyte layer 15 is formed in order to prevent a material (for example, palladium) forming the catalyst layer 16 from being diffused into the inorganic electrolyte layer 14. Incidentally, tantalum oxide ($Ta_2O_5$) may be described as tantalum pentoxide in some cases.

As described above, in production of a conventional light control element, it is known that a light control element which does not normally operate (also referred to as a defective product) is produced.

The present inventors conducted intensive studies and found out the reason for production of the defective product. The reason is that since electrical resistance of the inorganic electrolyte layer included in the defective product is small, a voltage is not applied effectively so that protons do not move in the light control element. In the light control element, when a voltage is applied between the transparent conductive film and the protective layer, protons move between the proton accumulation layer and the light control mirror layer. When a proper voltage is not applied between the transparent conductive film and the protective layer, protons do not move.

Specifically, in production processes of the conventional light control element having no organic electrolyte layer (hereinafter, referred to as the conventional light control element), a catalyst layer containing palladium is formed on an inorganic electrolyte layer containing tantalum oxide. At the time of this formation operation, palladium may be diffused into the inorganic electrolyte layer in some cases. In the case where palladium is diffused into the inorganic electrolyte layer, the diffused palladium decreases the electrical resistance of the inorganic electrolyte layer. Due to the decrease in the electrical resistance, a so-called leak current flows in the inorganic electrolyte layer when a voltage is applied to the inorganic electrolyte layer.

In this way, if palladium is diffused into the inorganic electrolyte layer, the total electrical resistance of the conventional light control element may become lower than a determined value in some cases. As a result, even when a voltage is applied to the defective product, protons do not move.

That is, when the light control mirror layer is intended to transition from the transmission state to the reflection state or from the reflection state to the transmission state by applying a voltage to the defective product, the electrical resistance of the inorganic electrolyte layer is decreased by diffusion of palladium so that protons do not move, and thus such transition is not performed.

As compared with the conventional light control element, the light control element 1 of this embodiment has a structure in which the organic electrolyte layer 15 is laminated on the inorganic electrolyte layer 14 and the catalyst layer 16 is further laminated thereon. The organic electrolyte layer 15 of the light control element 1 can prevent palladium contained in the catalyst layer 16 from being diffused into the inorganic electrolyte layer 14 when the catalyst layer 16 is laminated in production of a light control element 1. As a result, a decrease in electrical resistance in the inorganic electrolyte layer 14 due to the diffusion of palladium does not occur, and thus occurrence of the defective product can be suppressed.

In this way, according to this embodiment, it is possible to lower the occurrence rate of the defective product (also referred to as the percent defective of the light control element), that is, to suppress a decrease in yield ratio in production of the light control element.

Figure 3B:
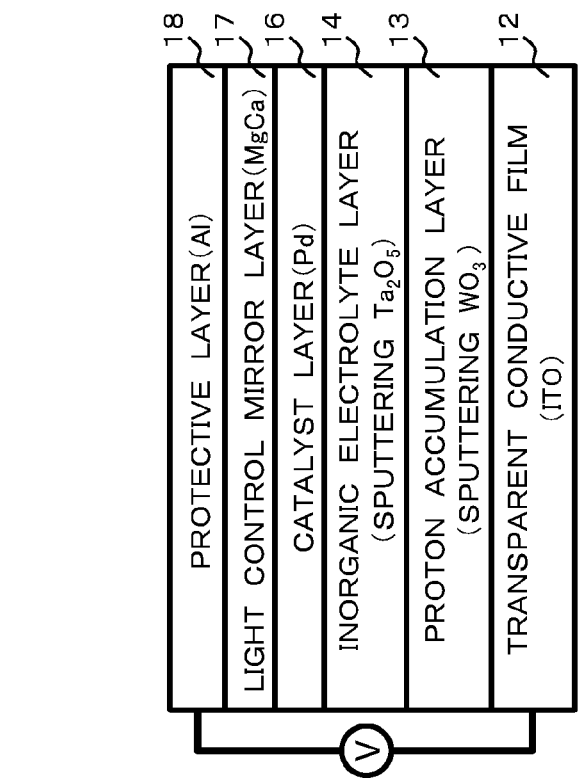
FIG. 3B is a cross-sectional view illustrating the configuration of a light control element of Comparative Example 1.
Figure 3A:
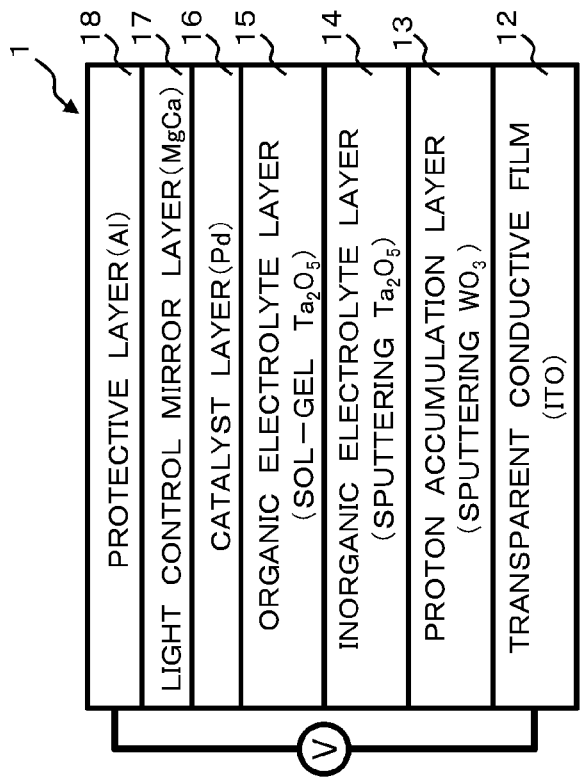
FIG. 3A is a cross-sectional view illustrating the configuration of a light control element of Example 1.

Next, regarding the effect obtained when the organic electrolyte layer 15 is provided, verification results of specific Examples will be described. FIG. 3A is a cross-sectional view illustrating the configuration of a light control element 1 of Example 1. FIG. 3A illustrates the configuration of Example 1 (the light control element 1 including the organic electrolyte layer 15). FIG. 3B is a cross-sectional view illustrating the configuration of a light control element 1 of Comparative Example 1. FIG. 3B illustrates the configuration of Comparative Example 1 (the conventional light control element). The light control element illustrated in FIG. 3B is, as described above, a defective product in which the light control mirror layer does not normally operate. Incidentally, in FIGS. 3A and 3B, the description of the substrate 11 is omitted.

The materials of respective layers of the light control element 1 of Example 1 used for verification were as follows. The transparent conductive film 12 was formed by ITO and the proton accumulation layer 13 was a tungsten oxide layer formed by a sputtering method. The inorganic electrolyte layer 14 was a tantalum oxide layer formed by a sputtering method and the organic electrolyte layer 15 was a tantalum oxide layer formed by a sol-gel method. The catalyst layer 16 was formed by palladium. The light control mirror layer 17 was formed by an alloy of magnesium and calcium. The protective layer 18 was formed by aluminum.

Meanwhile, the materials of Comparative Example 1 were as follows. The transparent conductive film 12 was formed by ITO and the proton accumulation layer 13 was a tungsten oxide layer formed by a sputtering method. The inorganic electrolyte layer 14 was a tantalum oxide layer formed by a sputtering method. The catalyst layer 16 was formed by palladium. The light control mirror layer 17 was formed by an alloy of magnesium and calcium. The protective layer 18 was formed by aluminum. That is, Comparative Example 1 has the configuration similar to that of Example 1, except that the organic electrolyte layer 15 was not provided.

Incidentally, the symbol "V" in FIGS. 3A and 3B schematically illustrates a circuit applying a voltage.

AC impedance measurement was performed to figure out electrical characteristics of Example 1 and Comparative Example 1. The AC impedance measurement is a method of measuring impedance of an analysis target by applying an AC voltage while a frequency is changed, and the identification of the equivalent circuit can be carried out from the measurement result.

Figure 4:
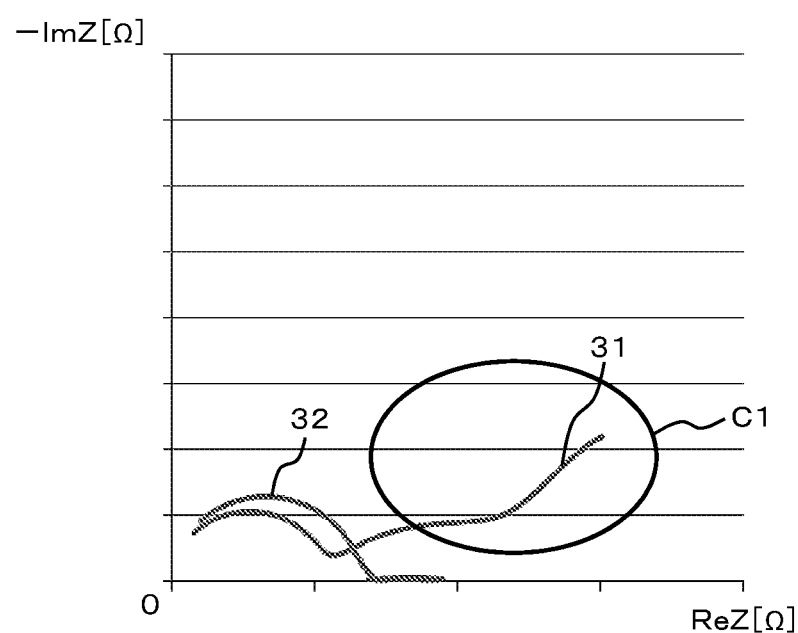
FIG. 4 is a graph showing the result of AC impedance measurement.

FIG. 4 is a graph showing the result of AC impedance measurement. The graph shown in FIG. 4 is a graph called Cole-Cole plot. In FIG. 4, impedances of two light control elements are measured with a plurality of frequencies by using an AC impedance method and the impedance spectra thereof are drawn on a complex plane. The vertical axis of FIG. 4 indicates an impedance in the imaginary region and the unit is Ω (ohm). The horizontal axis of FIG. 4 is an impedance in the real region and the unit is Ω (ohm). In FIG. 4, a graph 31 is a graph representing the characteristics of Example 1. In FIG. 4, a graph 32 is a graph representing the characteristics of Comparative Example 1. From the graphs of FIG. 4, it is found out that Comparative Example 1 has the impedance only in the region having a high frequency. On the other hand, it is found out that Example 1 has impedance not only in the region having a high frequency but also in a region C1 having a low frequency. That is, only response according to charge transfer is observed in Comparative Example 1; on the other hand, response according to mass transfer is also observed in Example 1. In other words, movement of protons does not occur in Comparative Example 1; on the other hand, movement of protons occurs in Example 1.

Next, cyclic voltammetry (CV) measurement was performed to figure out characteristics of Example 1 and Comparative Example 1. The results thereof will be described. The CV measurement is, for example, measurement in which a potential is swept with respect to the observation system by using a triangle wave voltage source and the potential is measured. In the CV measurement, electrochemical reaction such as movement of protons in the light control element can be observed.

Figure 5:
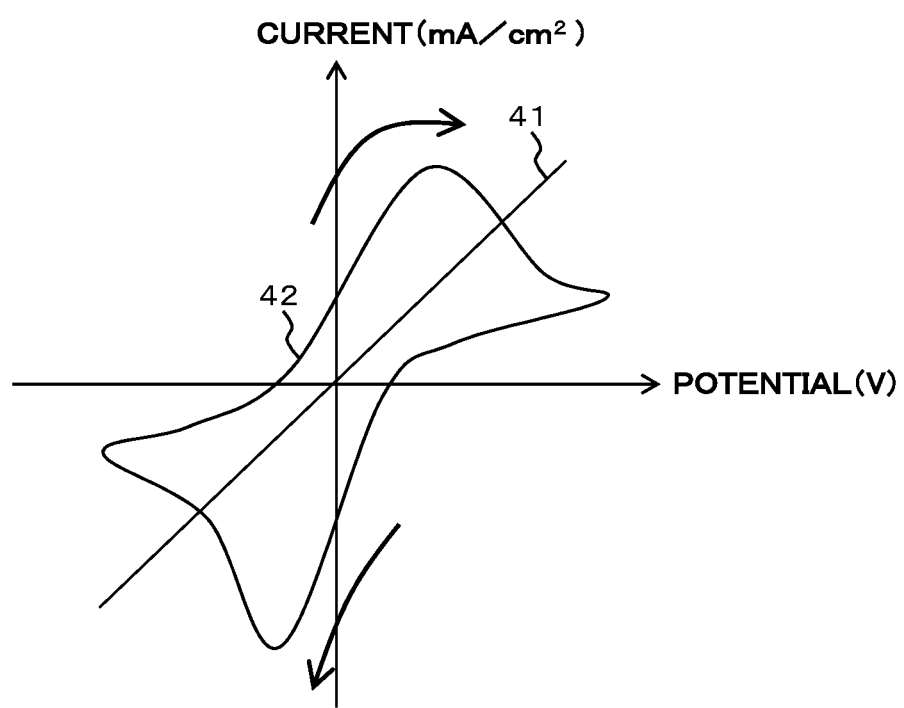
FIG. 5 is an explanatory diagram of CV measurement.

FIG. 5 is an explanatory diagram of CV measurement. In FIG. 5, the relationship between the potential and the current value obtained by CV measurement is represented by the graph. The horizontal axis indicates the potential and the unit is V. The vertical axis indicates the current and the unit is mA/cm². FIG. 5 shows two typical graphs obtained by CV measurement. A graph 41 is a graph obtained when electrochemical reaction does not occur. A graph 42 is a graph obtained when electrochemical reaction occurs.

Figure 6:
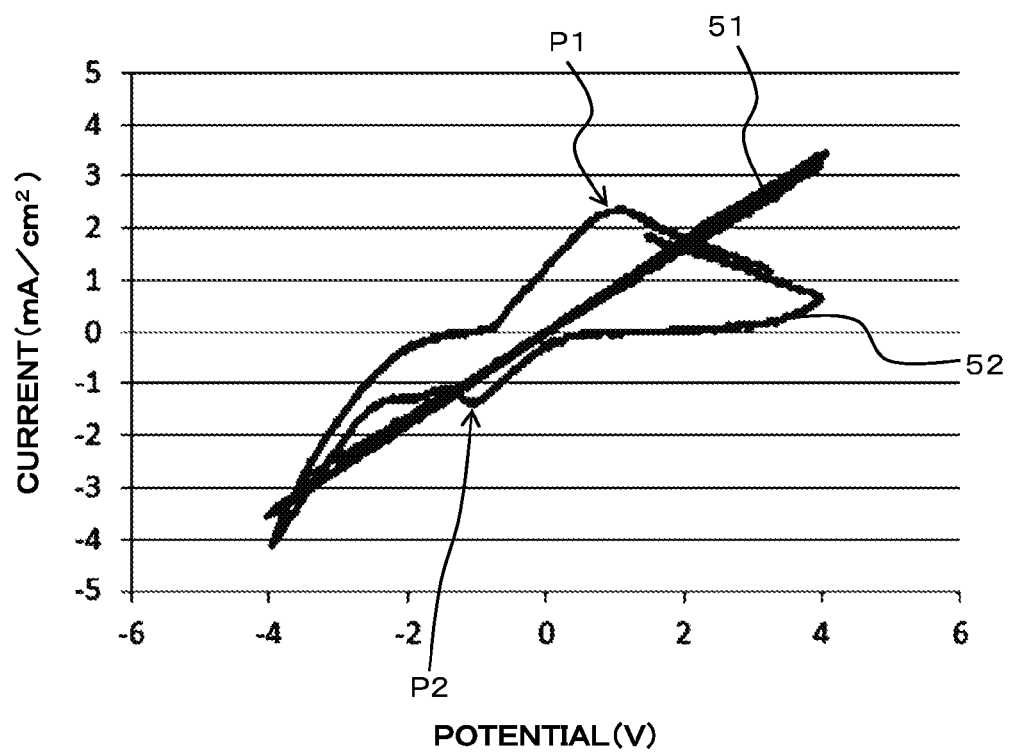
FIG. 6 is a graph showing the result of CV measurement.

FIG. 6 is a graph showing the result of CV measurement. The horizontal axis indicates the potential and the unit is V. The vertical axis indicates current and the unit is mA/cm². A graph 51 is a graph showing the measurement result of Comparative Example 1. A graph 52 is a graph showing the measurement result of Example 1. From the results shown in FIG. 6, movement of protons is not observed in Comparative Example 1; on the other hand, movement of protons is observed in Example 1. In the graph 52, the waveform near a peak P1 represents the observation result corresponding to occlusion of protons of the light control mirror layer 17. The waveform near a peak P2 represents the observation result corresponding to discharge of protons from the light control mirror layer 17. Therefore, it is found out that electrochemical reaction occurs in Example 1, but electrochemical reaction does not occur in Comparative Example 1.

The verification of CV measurement on Examples 2 to 6 and Comparative Example 2 was carried out. In FIGS. 7, 9, 11, 13, 15, and 17 to be described below, similarly to FIGS. 3A and 3B, the description of the substrate 11 is omitted and the symbol "V" schematically illustrates a circuit applying a voltage. In addition, the units in the horizontal axis and the vertical axis of the graph in each of FIGS. 8, 10, 12, 14, 16, and 18 are similar to those in FIG. 6.

Figure 7:
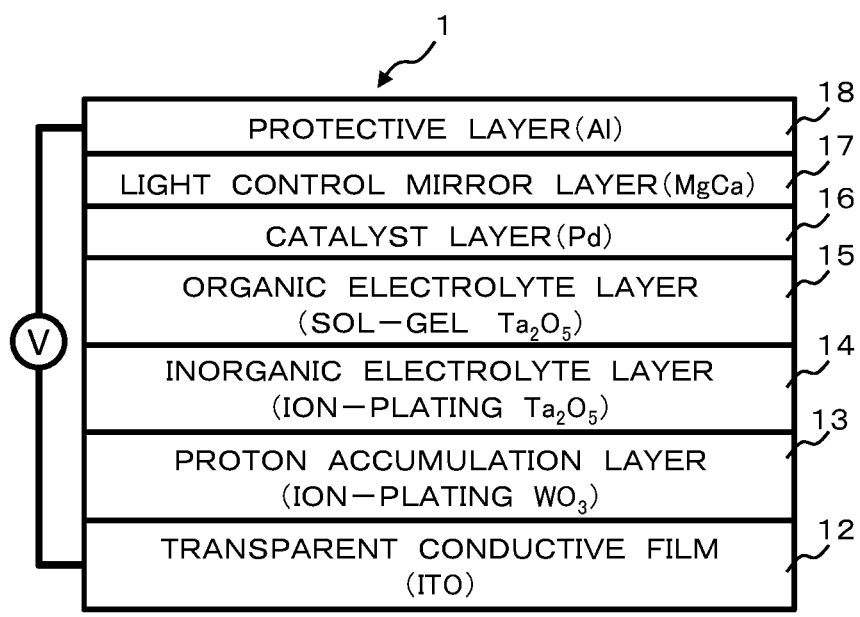
FIG. 7 is a cross-sectional view illustrating the configuration of a light control element of Example 2.
Figure 8:
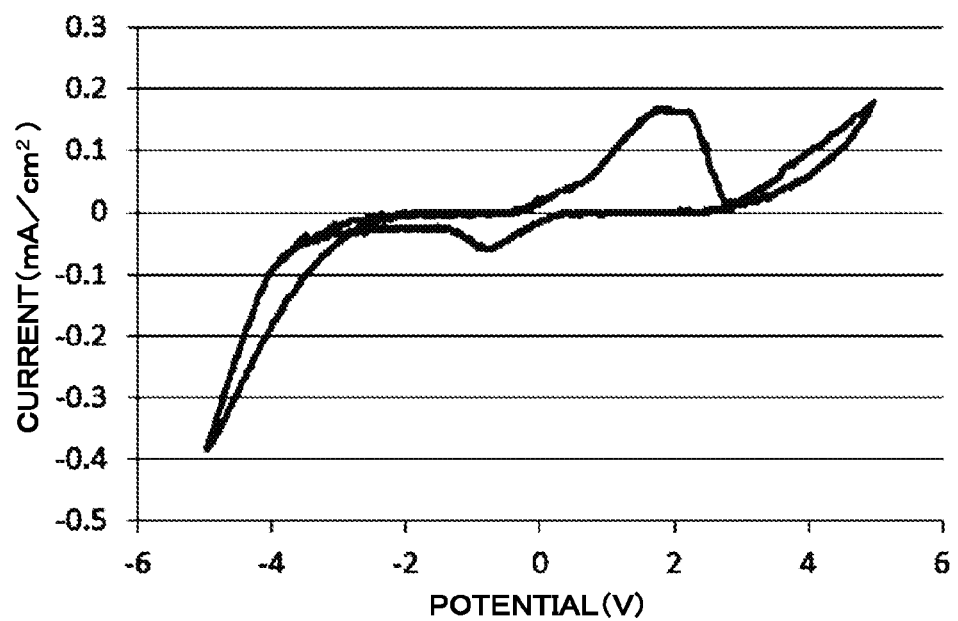
FIG. 8 is a graph showing the result of CV measurement of Example 2.

FIG. 7 is a cross-sectional view illustrating the configuration of a light control element 1 of Example 2. FIG. 8 is a graph showing the result of CV measurement of Example 2. The light control element 1 of Example 2 had the configuration similar to that of Example 1, except that the inorganic electrolyte layer 14 was a tantalum oxide layer formed by an ion-plating method, and the proton accumulation layer 13 was a tungsten oxide layer formed by an ion-plating method. As shown in FIG. 8, similarly to Example 1, the peak corresponding to occlusion of protons of the light control mirror layer 17 and the peak corresponding to discharge of protons from the light control mirror layer 17 were observed. Therefore, it is found out that electrochemical reaction occurs when the inorganic electrolyte layer 14 is a tantalum oxide layer formed by an ion-plating method and the proton accumulation layer 13 is a tungsten oxide layer formed by an ion-plating method.

Figure 9:
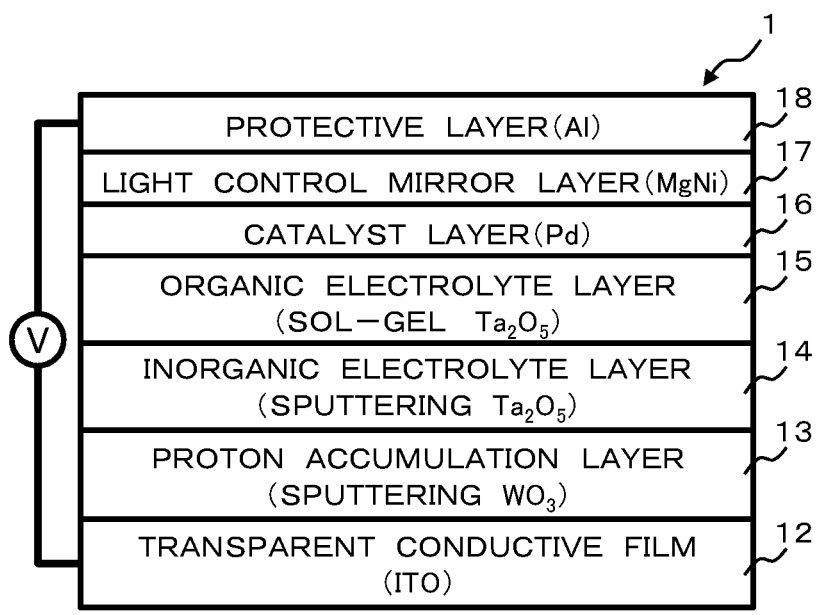
FIG. 9 is a cross-sectional view illustrating the configuration of a light control element of Example 3.
Figure 10:
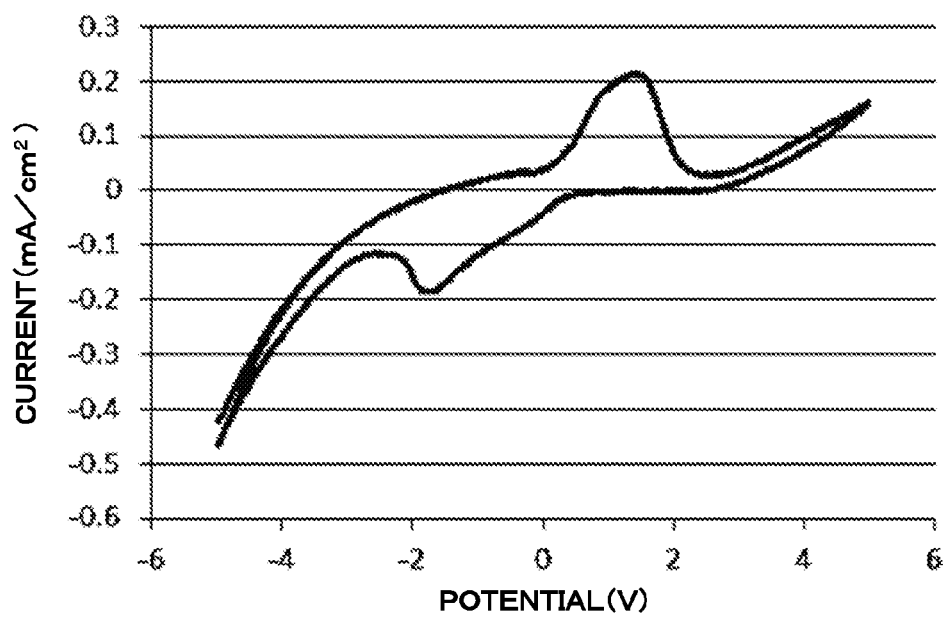
FIG. 10 is a graph showing the result of CV measurement of Example 3.

FIG. 9 is a cross-sectional view illustrating the configuration of a light control element 1 of Example 3. FIG. 10 is a graph showing the result of CV measurement of Example 3. The light control element 1 of Example 3 had the configuration similar to that of Example 1, except that the light control mirror layer 17 was formed by an alloy of magnesium and nickel. As shown in FIG. 10, similarly to Example 1, the peak corresponding to occlusion of protons of the light control mirror layer 17 and the peak corresponding to discharge of protons from the light control mirror layer 17 were observed. Therefore, it is found out that electrochemical reaction occurs by providing the organic electrolyte layer 15 when the light control mirror layer 17 is formed by an alloy of magnesium and nickel.

Figure 11:
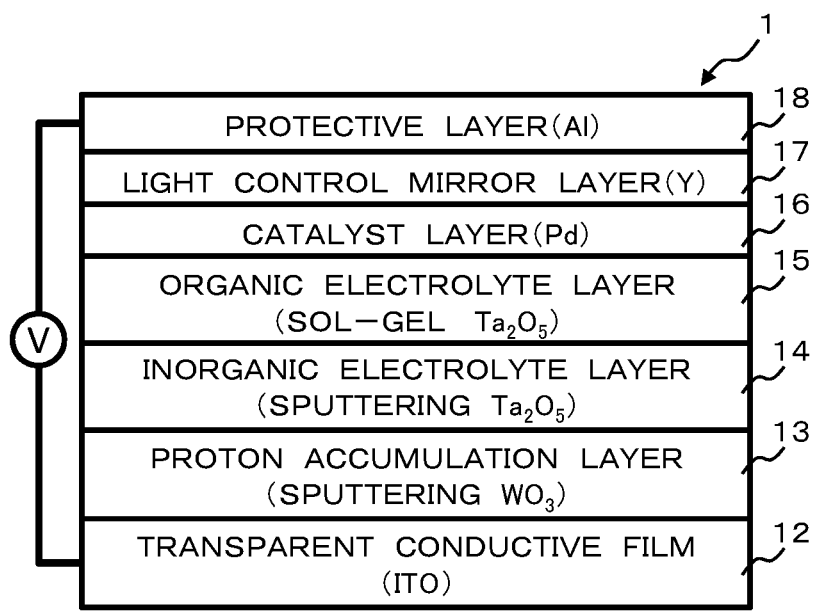
FIG. 11 is a cross-sectional view illustrating the configuration of a light control element of Example 4.
Figure 12:
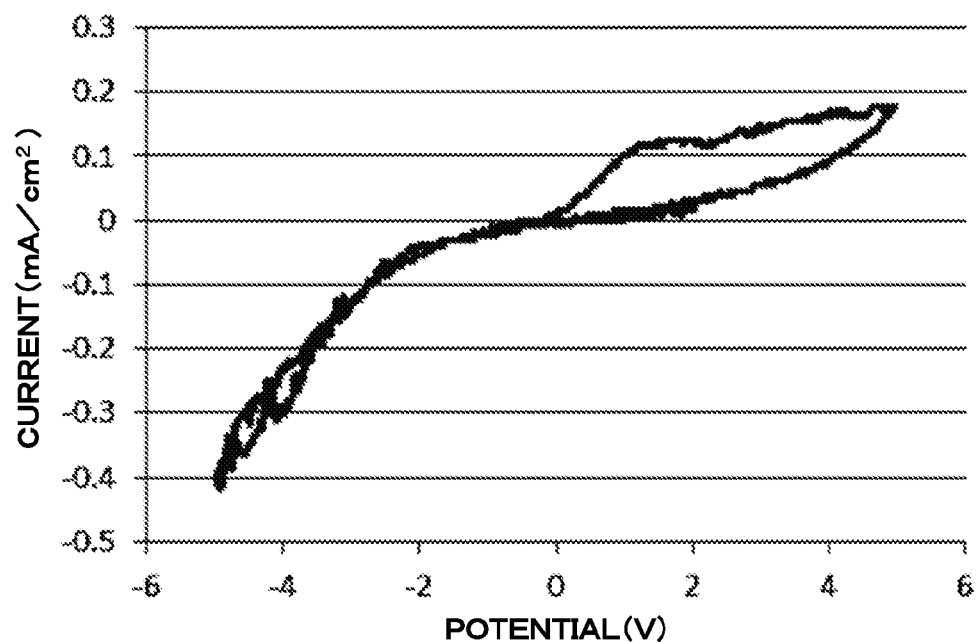
FIG. 12 is a graph showing the result of CV measurement of Example 4.

FIG. 11 is a cross-sectional view illustrating the configuration of a light control element 1 of Example 4. FIG. 12 is a graph showing the result of CV measurement of Example 4. Example 4 had the configuration similar to that of Example 1, except that the light control mirror layer 17 was an yttrium layer. As shown in FIG. 12, similarly to Example 1, the peak corresponding to occlusion of protons of the light control mirror layer 17 and the peak corresponding to discharge of protons from the light control mirror layer 17 were observed. Therefore, it is found out that electrochemical reaction occurs by providing the organic electrolyte layer 15 when the light control mirror layer 17 is an yttrium layer.

Figure 13:
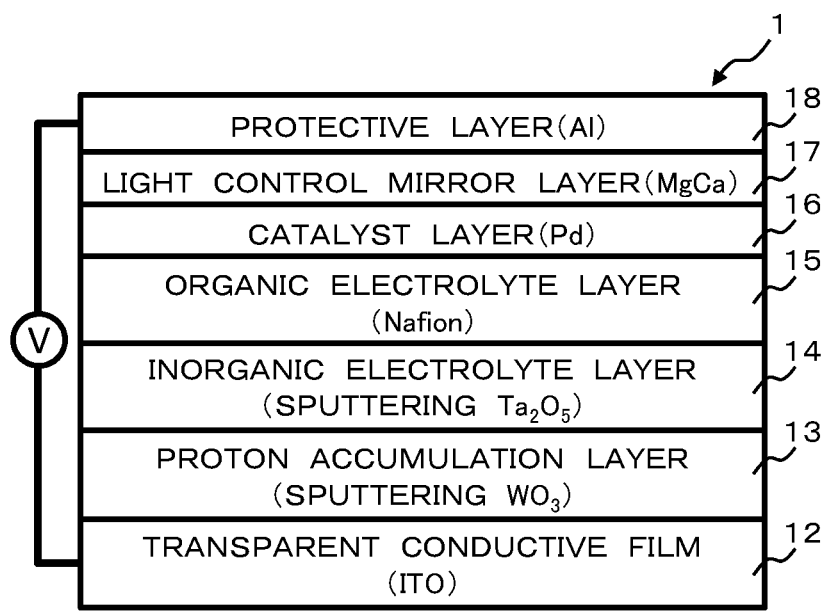
FIG. 13 is a cross-sectional view illustrating the configuration of a light control element of Example 5.
Figure 14:
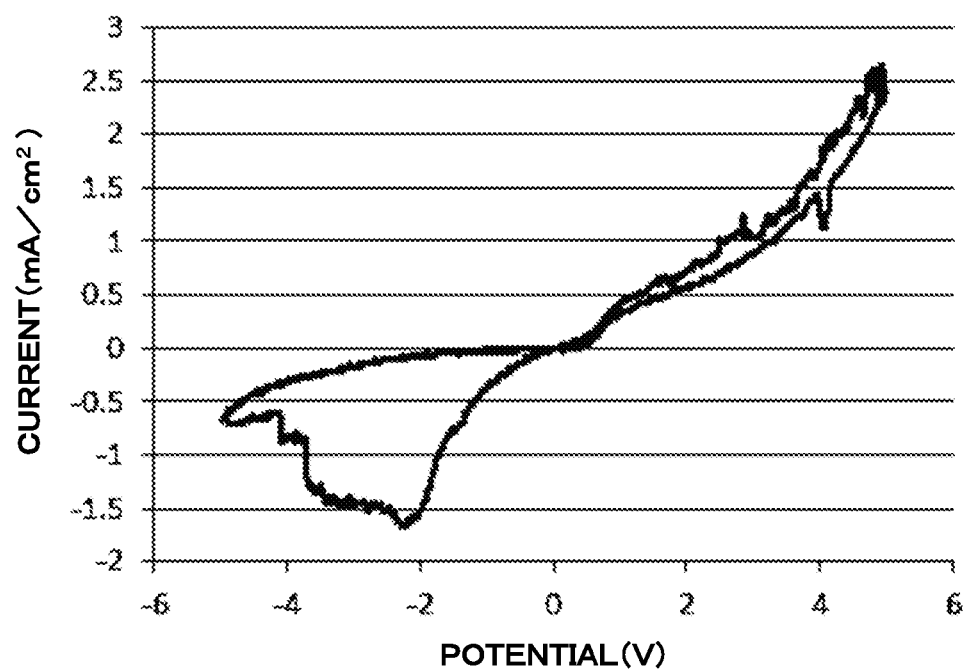
FIG. 14 is a graph showing the result of CV measurement of Example 5.

FIG. 13 is a cross-sectional view illustrating the configuration of a light control element 1 of Example 5. FIG. 14 is a graph showing the result of CV measurement of Example 5. Example 5 had the configuration similar to that of Example 1, except that the organic electrolyte layer 15 was a Nafion layer. As shown in FIG. 14, similarly to Example 1, the peak corresponding to occlusion of protons of the light control mirror layer 17 and the peak corresponding to discharge of protons from the light control mirror layer 17 were observed. Therefore, it is found out that electrochemical reaction occurs when the organic electrolyte layer 15 is a Nafion layer.

Figure 15:
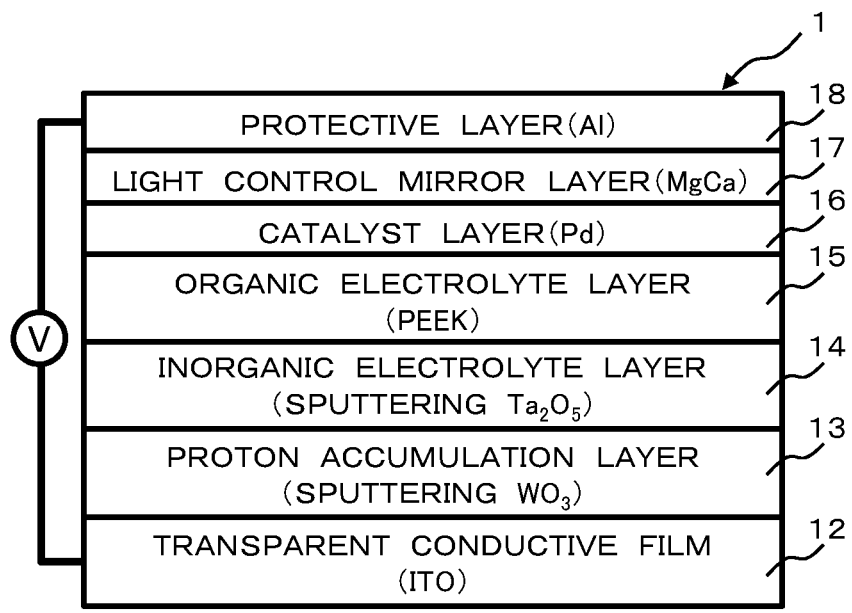
FIG. 15 is a cross-sectional view illustrating the configuration of a light control element of Example 6.
Figure 16:
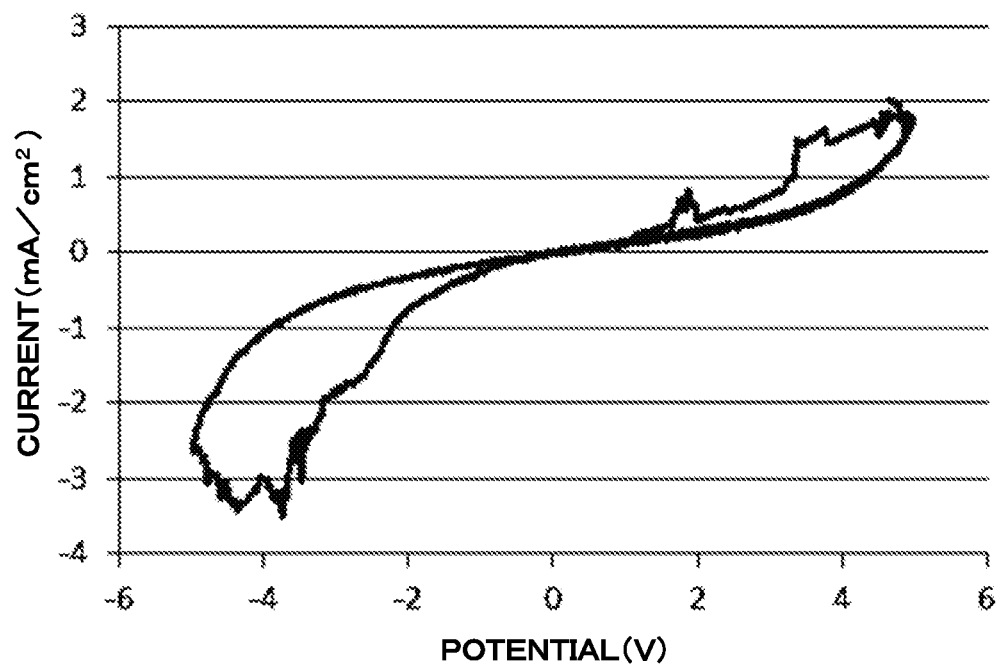
FIG. 16 is a graph showing the result of CV measurement of Example 6.

FIG. 15 is a cross-sectional view illustrating the configuration of a light control element 1 of Example 6. FIG. 16 is a graph showing the result of CV measurement of Example 6. Example 6 had the configuration similar to that of Example 1, except that the organic electrolyte layer 15 was formed by a PEEK layer. As shown in FIG. 16, similarly to Example 1, the peak corresponding to occlusion of protons of the light control mirror layer 17 and the peak corresponding to discharge of protons from the light control mirror layer 17 were observed. Therefore, it is found out that electrochemical reaction occurs when the organic electrolyte layer 15 is a PEEK layer.

Figure 17:
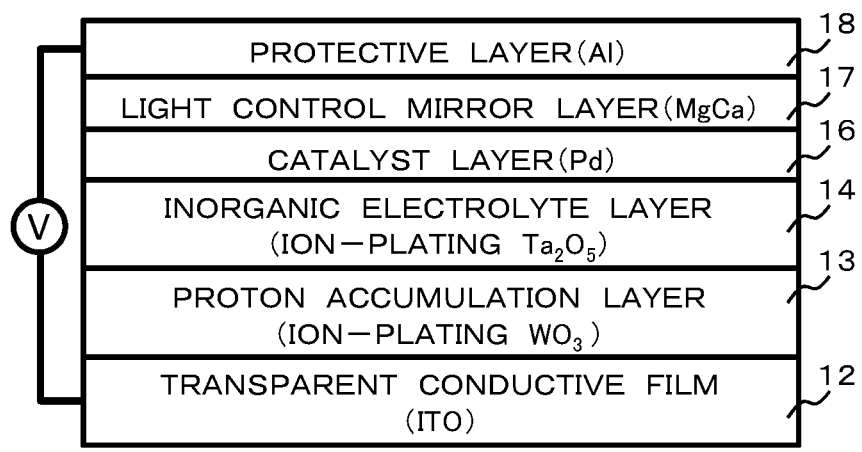
FIG. 17 is a cross-sectional view illustrating the configuration of a light control element of Comparative Example 2.
Figure 18:
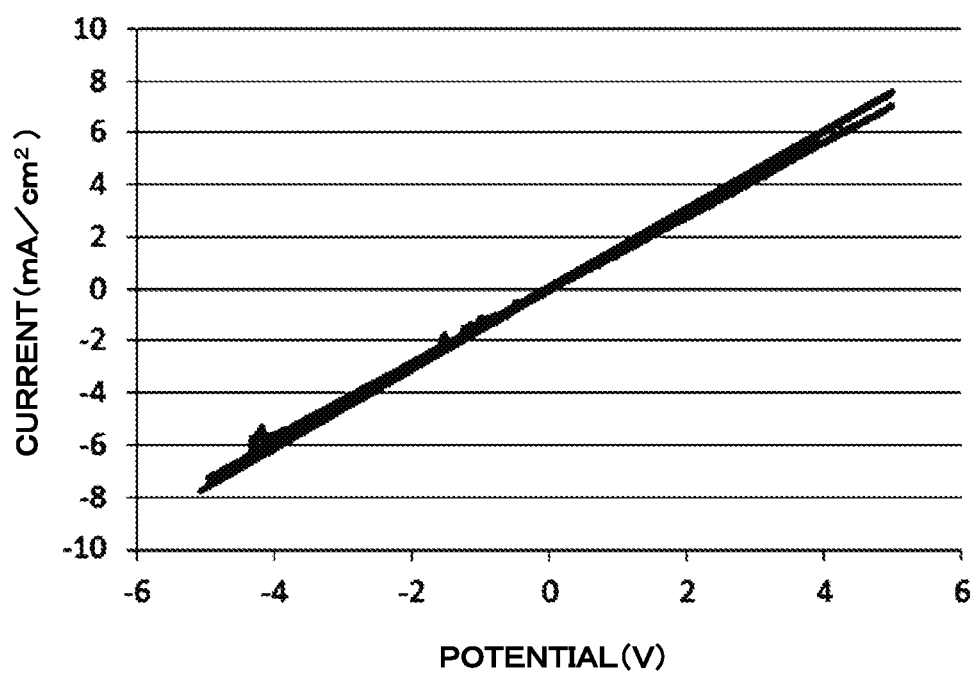
FIG. 18 is a graph showing the result of CV measurement of Comparative Example 2.

FIG. 17 is a cross-sectional view illustrating the configuration of a light control element 1 of Comparative Example 2. FIG. 18 is a graph showing the result of CV measurement of Comparative Example 2. Comparative Example 2 had the configuration similar to that of Comparative Example 1, except that the proton accumulation layer 13 was a tungsten oxide layer formed by an ion-plating method and the inorganic electrolyte layer 14 was a tantalum oxide layer formed by an ion-plating method. As shown in FIG. 18, when the tungsten oxide layer and the tantalum oxide layer formed by an ion-plating method were used and the organic electrolyte layer was not provided, any peaks according to movement of protons were not observed. Therefore, it is found out that electrochemical reaction does not occur when the organic electrolyte layer is not provided.

From the CV measurement results of Examples 1 to 6 and Comparative Examples 1 and 2, it is found out that when the organic electrolyte layer 15 is provided, occlusion of protons of the light control mirror layer 17 and discharge of protons from the light control mirror layer 17 occur, and thus electrochemical reaction occurs.

As described above, in the light control element 1 of this embodiment, the organic electrolyte layer 15 is provided between the inorganic electrolyte layer 14 and the catalyst layer 16. The organic electrolyte layer 15 makes it possible that palladium forming the catalyst layer 16 is prevented from being diffused into the inorganic electrolyte layer 14 when the catalyst layer 16 is laminated in the production processes. Furthermore, it is possible to prevent a problem in that movement of protons does not occur due to the diffusion of palladium when a voltage is applied to the light control element. In this way, when the organic electrolyte layer 15 is provided, a decrease in yield ratio in production of the light control element can be suppressed.

Figure 19:
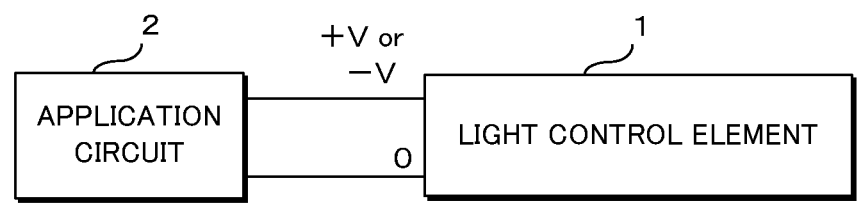
FIG. 19 is a block diagram illustrating the configuration of an example of non-limiting light control device.

Next, a light control device using the above-mentioned light control element 1 will be described. FIG. 19 is a block diagram illustrating the configuration of a light control device 10. The light control device 10 includes the light control element 1 and an application circuit 2. The application circuit 2 is a circuit applying a voltage between the transparent conductive film 12 and the protective layer 18 of the light control element 1. Specifically, the application circuit 2 applies a voltage between the transparent conductive film 12 and the light control mirror layer 17 and causes the light control mirror layer 17 to transition from the transmission state to the reflection state or from the reflection state to the transmission state.

If a first output terminal is set to 0 (V), the application circuit 2 enables a second output terminal to be set to +V (V) or −V (V). When the second output terminal is set to +V (V) or −V (V), the application circuit 2 causes the light control mirror layer 17 of the light control element 1 to transition to the reflection state or the transmission state and the proton accumulation layer 13 of the light control element 1 to transition to the colored state or the transparent state. Specifically, the application circuit 2 applies a first voltage (for example, a voltage having a first polarity) to the light control element 1 such that the potential of the protective layer 18 becomes higher than the potential of the transparent conductive film 12. This application refers to that a voltage is applied in a predetermined direction. When a voltage is applied in the predetermined direction, protons move from the light control mirror layer 17 to the proton accumulation layer 13. When protons move, the light control mirror layer 17 is changed to be in the reflection state and the proton accumulation layer 13 is changed to be in the colored state. In addition, the application circuit 2 applies a second voltage different from the first voltage (for example, a voltage having a second polarity different from the first polarity) to the light control element 1 such that the potential of the protective layer 18 becomes lower than the potential of the transparent conductive film 12. This application refers to that a voltage is applied in a direction opposite to the predetermined direction. When the voltage (second voltage) is applied in a direction opposite to the predetermined direction, protons move from the proton accumulation layer 13 to the light control mirror layer 17. When protons move, the light control mirror layer 17 is changed to be in the transmission state and the proton accumulation layer 13 is changed to be in the transmission state. As described above, the light control device 10 changes the state of the light control element 1 depending on a voltage output from the application circuit and allows light to be reflected or transmitted.

As described above, according to an aspect of the present disclosure, it is possible to suppress a decrease in yield ratio in production of a light control element.

Technical characteristics (configuration requirements) described in each embodiment may be combined with each other, and new technical characteristics may be formed by combining the same.

It should be understood that the embodiments disclosed herein are illustrative and non-restrictive in every respect. The scope of the present invention is defined not by the foregoing description but by the scope of the claims, and is intended to include meanings equivalent to the scope of the claims and all modifications within the scope.

It is to be noted that, as used herein and in the appended claims, the singular forms "a", "an", and "the" include plural referents unless the context clearly dictates otherwise.

What is claimed is:

1. A light control element comprising:
   a transparent conductive film;
   a proton accumulation layer on the transparent conductive film;
   an inorganic electrolyte layer on the proton accumulation layer;
   an organic electrolyte layer on the inorganic electrolyte layer;
   a catalyst layer on the organic electrolyte layer; and
   a light control mirror layer on the catalyst layer.

2. The light control element according to claim 1,
   wherein the catalyst layer is formed by a material that increases a velocity of protons supplied to the light control mirror layer or discharged from the light control mirror layer, and
   the organic electrolyte layer is formed by a material which prevents a material forming the catalyst layer from being diffused into the inorganic electrolyte layer.

3. The light control element according to claim 2,
   wherein when a first voltage is applied between the transparent conductive film and the light control mirror layer, protons contained in the proton accumulation layer move to the light control mirror layer so that the light control mirror layer transitions from a transmission state to a reflection state, and when a second voltage different from the first voltage is applied between the transparent conductive film and the light control mirror layer, protons contained in the light control mirror layer move to the proton accumulation layer so that the light control mirror layer transitions from the reflection state to the transmission state.

4. The light control element according to claim 3, wherein the organic electrolyte layer is a tantalum oxide layer, a polyether ether ketone layer, or a Nafion layer.

5. A light control device comprising:
the light control element according to claim 3; and
an application circuit configured to apply the first voltage or the second voltage between the transparent conductive film and the light control mirror layer to cause the light control mirror layer to transition from the transmission state to the reflection state or from the reflection state to the transmission state.

6. The light control element according to claim 2, wherein the organic electrolyte layer is a tantalum oxide layer, a polyether ether ketone layer, or a Nafion layer.

7. The light control element according to claim 1, wherein the organic electrolyte layer includes a polyether ether ketone layer, or a Nafion layer.

8. A method for producing a light control element, the method comprising:
laminating a transparent conductive film on a substrate;
laminating a proton accumulation layer on the transparent conductive film;
laminating an inorganic electrolyte layer on the proton accumulation layer;
laminating an organic electrolyte layer on the inorganic electrolyte layer;
laminating a catalyst layer on the organic electrolyte layer; and
laminating a light control mirror layer on the catalyst layer.

9. The method for producing a light control element according to claim 8, wherein the organic electrolyte layer is a tantalum pentoxide layer formed by a sol-gel method.

10. The method for producing a light control element according to claim 9,
wherein the inorganic electrolyte layer is a tantalum pentoxide layer formed by a sputtering method, and
the organic electrolyte layer is a tantalum pentoxide layer laminated on the inorganic electrolyte layer by a sol-gel method.

11. The method for producing a light control element according to claim 10,
wherein the organic electrolyte layer is a tantalum pentoxide layer formed by a spin coating method.

12. The method for producing a light control element according to claim 9,
wherein the organic electrolyte layer is a tantalum pentoxide layer formed by a spin coating method.

13. The method for producing a light control element according to claim 8,
wherein the inorganic electrolyte layer is a tantalum pentoxide layer formed by a sputtering method, and
the organic electrolyte layer is a tantalum pentoxide layer laminated on the inorganic electrolyte layer by a sol-gel method.

14. The method for producing a light control element according to claim 13,
wherein the organic electrolyte layer is a tantalum pentoxide layer formed by a spin coating method.

15. The method for producing a light control element according to claim 8,
wherein the organic electrolyte layer is a tantalum pentoxide layer formed by a spin coating method.

* * * * *